(12) United States Patent
Sanders et al.

(10) Patent No.: US 6,249,832 B1
(45) Date of Patent: Jun. 19, 2001

(54) COMPUTER SYSTEM BUS TERMINATION FOR AN INTEL SLOT 2 BUS

(75) Inventors: Michael C. Sanders; Stephen F. Contreras, both of Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/248,767

(22) Filed: Feb. 12, 1999

(51) Int. Cl.[7] .............................. G06F 13/40; H03K 17/16

(52) U.S. Cl. .............................. 710/126; 710/129; 326/30

(58) Field of Search ........................... 710/100, 126–130; 326/30

(56) References Cited

U.S. PATENT DOCUMENTS

| | | | |
|---|---|---|---|
| 5,721,821 | * | 2/1998 | Kawano et al. ............... 710/244 |
| 5,778,202 | * | 7/1998 | Kuroishi et al. ............... 710/126 |
| 6,067,596 | * | 5/2000 | Nguyen et al. ............... 710/129 |

OTHER PUBLICATIONS

"Intel ®Pentium®Xeon ™Processor Bus Terminator Design Guidelines", Intel Corporation, Jul. 1998, pp. 1–11.

"330–Contact Slot Connector (SC330) Design Guidelines", Intel Corporation, Sep. 1998, pp. 1–39.

* cited by examiner

Primary Examiner—Sumati Lefkowitz

(57) ABSTRACT

A bus configuration and associated termination for an Intel Slot 2 bus supporting communication for at least one Intel Pentium II Xeon processor. The Intel Slot 2 bus is configured in an in-line topology and includes a plurality of Intel Slot 2 bus connectors connected to the Intel Slot 2. A first plurality of bus terminators are electrically connected to a first end of the in-line Intel Slot 2 bus and a second plurality of bus terminators are electrically connected to a second end of the in-line Intel Slot 2 bus. The first and second plurality of bus terminators are constructed in accordance with termination specifications required by Intel on terminator cards which are inserted into unpopulated Intel Slot 2 bus connectors except that one end of the bus has the one hundred and fifty ohm pull-up resistor required by Intel replaced with an eighty two ohm pull-up resistor. Furthermore, each terminator card inserted into unpopulated Intel Slot 2 bus connectors include only, a short circuit connection between a power_enable1 signal and a power_enable2 signal, a short circuit connection between a JTAG TDI signal and a JTAG TDO signal, a first resistor having a resistance value of ten kilohms connected between a serial communication bus line SCLK and a supply power voltage VCCSM, and a second resistor having a resistance value of ten kilohms connected between a serial communication bus line SDAT and the supply power voltage VCCSM.

10 Claims, 3 Drawing Sheets

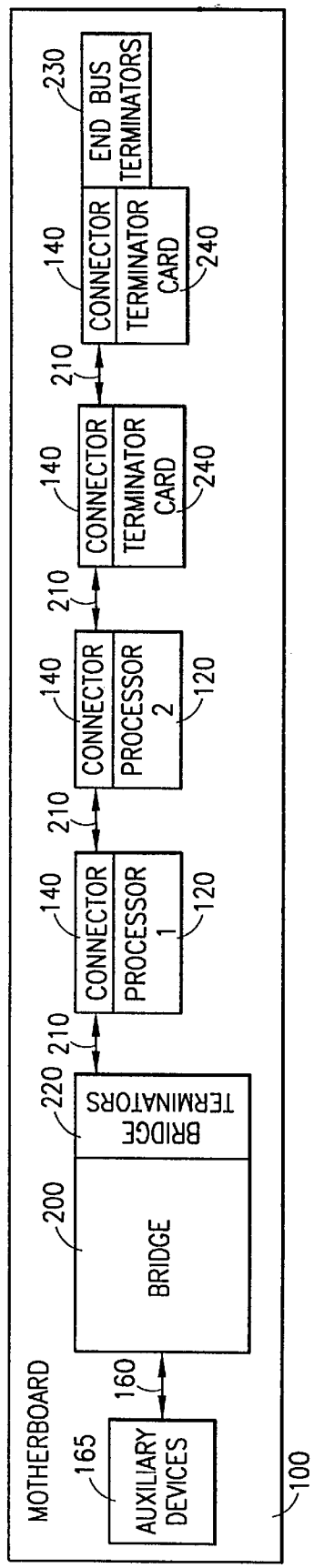

COMPUTER SYSTEM BUS TERMINATION FOR AN INTEL SLOT 2 BUS

FIELD OF THE INVENTION

The present invention pertains in general to signal line terminations, and more particularly, but not by way of limitation, to a bus configuration and associated signal line terminations for Intel Pentium II Xeon processors communicating across an Intel Slot 2 bus.

BACKGROUND OF THE INVENTION

Computer systems typically include one or more system busses which permit communication of data and control signals between processors and various functionality of the computer system. In computer systems which incorporate more than a single bus a bridge is frequently used to interface between busses. The speed at which a bus must operate is determined in part by the speed at which processors connected to the bus operate. Bus speeds have steadily increased with a corresponding increase in processor operating speeds.

Computer system busses are essentially a grouping of signal transmission lines. Therefore, they experience various performance related problems common to signal transmission lines as operating speeds increase. For example, any circuitry, electrical components, physical connectors or other connections to a bus signal line create a discontinuity which generates reflections to electrical signals transmitted on the bus signal line thereby affecting the performance of the bus. Using proper terminations on the signal lines minimizes reflections and attenuates other performance related problems such as cross-talk between bus lines. In the past, busses operated at relatively slow speeds requiring a simple in-line topology which was easily terminated. Today busses, which support high speed processors, however, increasingly require specially designed busses incorporating elaborate topologies and custom designed termination schemes.

A multiprocessor system which is currently gaining wide acceptance in the computer industry incorporates one or more Intel Pentium II Xeon processors which communicate with each other across an Intel Slot 2 bus and which further communicate with auxiliary devices via a bridge which communicates with the auxiliary devices across other types of busses. The Intel Slot 2 bus includes a System Management (SM) Bus, a P6 Gunning Transceiver Logic (P6 GTL) Bus, a boundary-scan JTAG bus, various status signals and various test lines.

Due in part to high operating speeds, Intel, the manufacturer of the Intel Pentium II Xeon processor, requires that computer systems using multiple Xeon processors be configured in a star configuration with a central interface bridge and that unpopulated Intel Slot 2 connectors be populated with a terminator card having an appropriate termination for each signal line on the Intel Slot 2 bus. The terminations are also specified by Intel and are specifically designed for the Intel Slot 2 bus. Intel, which developed and manufactures the Pentium II Xeon processor, is recognized as an authority in the design and use of the Pentium II Xeon processor including the configuration and termination of the Intel Slot 2 bus using the Pentium II Xeon processor.

Because of the speed at which the Intel Pentium II Xeon processor and Intel Slot 2 bus operate and because of the small voltage swing of signals communicated across the Intel Slot 2 bus as compared to past technology, computer manufacturers follow the requirements of Intel and configure the Intel Slot 2 bus in a star configuration and terminate all unpopulated connector slots on the Intel Slot 2 bus with terminations as specified by Intel. Use of a star configuration, however, requires considerable "real estate" on the motherboard to implement and complicates the layout and routing of signals on the motherboard. Furthermore, the use of terminator cards inserted in each unused Intel Slot2 bus connector and populated with components and electrical traces to terminate the Intel Slot 2 bus in accordance with Intel's requirements increases the cost of the computer system. It would be advantageous therefore, to devise a bus configuration which requires less space to implement and a method for bus line termination which requires few components and electrical traces.

SUMMARY OF THE INVENTION

The present invention comprises a bus configuration and associated termination for an Intel Slot 2 bus supporting communication for at least one Intel Pentium II Xeon processor. The Intel Slot 2 bus is configured in an in-line topology and includes a plurality of Intel Slot 2 bus connectors connected to the Intel Slot 2 bus for interfacing Intel Pentium II Xeon processors to the Intel Slot 2 bus.

A first plurality of bus terminators are electrically connected to a first end of the in-line Intel Slot 2 bus and a second plurality of bus terminators are electrically connected to a second end of the in-line Intel Slot 2 bus. The first and second plurality of bus terminators are constructed in accordance with termination specifications required by Intel on terminator cards which are inserted into unpopulated Intel Slot 2 bus connectors except that one end of the bus has the one hundred and fifty ohm pull-up resistor required by Intel is replaced with an eighty two ohm pull-up resistor.

Furthermore, each terminator card inserted into unpopulated Intel Slot 2 bus connectors include only, a short circuit connection between a power_enable1 signal and a power_enable2 signal, a short circuit connection between a JTAG TDI signal and a JTAG TDO signal, a first resistor having a resistance value of ten kilohms connected between a serial communication bus line SCLK and a supply power voltage VCCSM, and a second resistor having a resistance value of ten kilohms connected between a serial communication bus line SDAT and the supply power voltage VCCSM.

BRIEF DESCRIPTION OF THE DRAWINGS

A more complete understanding of the present invention may be had by reference to the following Detailed Description and appended claims, when taken in conjunction with the accompanying Drawings wherein:

FIG. 2 is a functional block diagram of a communication bus and bus termination for the Intel Pentium II Xeon processor comprising the present invention;

FIG. 3 is a chart listing prior art terminations for the Intel Slot 2 bus and associated terminators of the present invention.

DETAILED DESCRIPTION

Intel references entitled "Deschutes Slot 2 Processor GLT Plus Layout Guidelines," Intel document number OR-1041 and "Deschutes Slot 2 Processor Bus Terminator Design Guidelines," Intel document number OR-1214, are incorporated herein by reference to the fullest extent possible.

Figure 1:
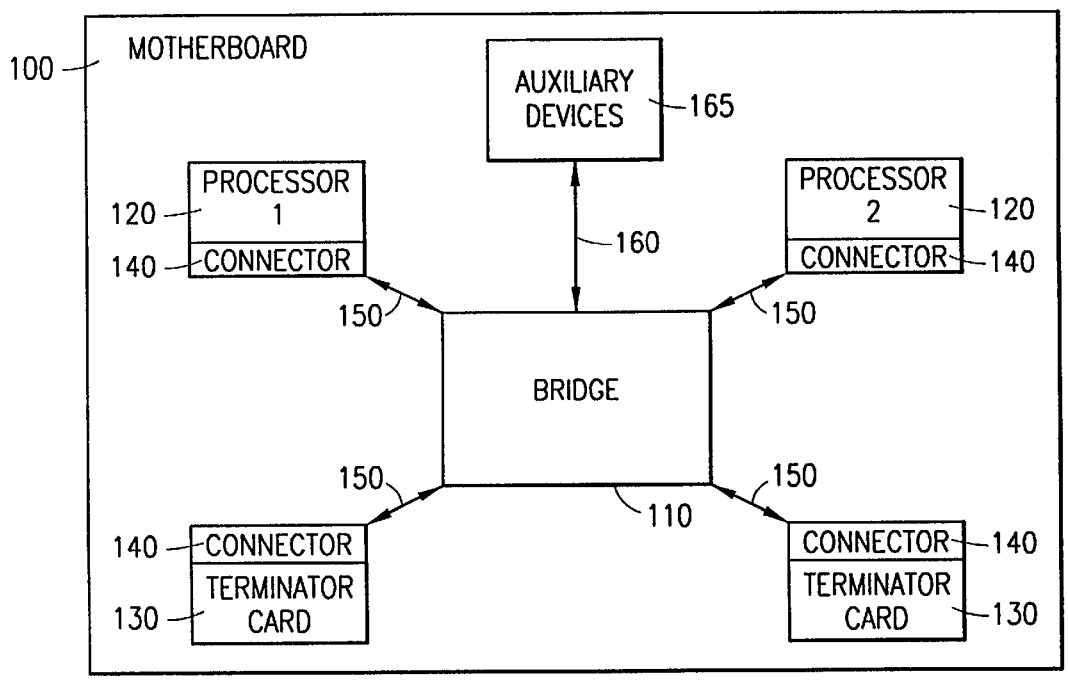
FIG. 1 is a functional block diagram of a communication bus and bus termination for an Intel Pentium II Xeon processor constituting the prior art.

Referring now to FIG. 1, there is illustrated a functional block diagram of a communication bus and bus termination for an Intel Pentium II Xeon processor constituting the prior art. Populated on a motherboard 100 is a bridge 110, two Intel Pentium II Xeon processors 120, two termination cards 130, four Intel Slot 2 connectors 140, an Intel Slot 2 bus 150 configured in a star topology, and a secondary bus 160. Although two Xeon processors 120 are shown connected to the bridge 110, the bridge 110 is capable of supporting from one to four Xeon processors 120. The Intel Slot 2 bus 150 effectuates communication between the Xeon processors 120 and the bridge 110 while the bridge 110 effectuates communication between the Xeon processors 120 and other auxiliary devices 165 located on the secondary bus 160. Although the secondary bus 160 and the auxiliary devices 165 are depicted as being located on the motherboard 110, the secondary bus 160 and auxiliary devices 165 may alternatively be located off the motherboard 100. The secondary bus 160 can be any type of bus such as a Peripheral Component Interface (PCI) bus or a Small Computer System Interface (SCSI) bus among others. The Intel Slot 2 bus 150 is an aggregation of various smaller busses, status lines and test lines and includes a System Management (SM) bus, a P6 Gunning Transceiver Logic (P6 GTL) bus, and a boundary-scan JTAG bus.

Intel, the manufacturer of the Intel Pentium II Xeon processor 120, is a well recognized authority regarding the proper design and use of Xeon processors 120. Intel specifies, and it is recognized in the industry, that computer systems using multiple Xeon processors 160 are to be configured in a star configuration with the bridge 110 and furthermore, that unpopulated Intel Slot 2 connectors 140 are to be populated with a terminator card 130 having an appropriate termination for each signal line on the Intel Slot 2 bus 150 as specified by Intel. The required terminations are well known in the industry and are specified in, "Deschutes Slot 2 Processor GLT Plus Layout Guidelines," Intel document number OR-1041. The terminators generally require that each bus signal line either have no connection, be connected to ground, be connected to a voltage source of +1.5 volts, or be connected to a pull-up resistor having a resistance value of one hundred fifty ohms connected to VTT. Intel established these requirements to eliminate electrical signal reflections created at points of discontinuity associated with each connection to the Intel Slot 2 bus 150.

Referring additionally now to FIG. 2, there is illustrated a functional block diagram of a communication bus and bus termination for the Intel Pentium II Xeon processor comprising the present invention. In the present invention, the motherboard 100 is populated with a bridge 200, four Intel Slot 2 connectors 140, two Intel Pentium II Xeon processors 120, an Intel Slot 2 bus 210 configured in an in-line topology, a plurality of bridge terminators 220, a plurality of bus end terminators 230, two termination cards 240, a secondary bus 160 and auxiliary devices 165. Although the secondary bus 160 and the auxiliary devices 165 are depicted as being located on the motherboard 110, the secondary bus 160 and the auxiliary devices 165 may alternatively be located off the motherboard 100. The secondary bus 160 can be any type of bus, such as a PCI bus or a SCSI bus, among others. The Intel Slot 2 bus 210, configured in an in-line topology, effectuates communication between the Xeon processors 120 and the bridge 200 while the bridge 200 effectuates communication between the Xeon processors 120 and the auxiliary devices 165 located on the secondary bus 160.

In the present invention, the Intel Slot 2 bus 210 is configured using an in-line topology rather than the star topology configuration required by Intel. Use of the in-line topology occupies less space on the motherboard 110, results in a more compact design than the star topology, and is easier to layout and route signal lines.

Referring additionally now to FIG. 3, there is illustrated a chart listing prior art terminations for the Intel Slot 2 bus and associated terminators of the present invention. With the exception of the terminations described in FIG. 4, the terminations cards 240 of the present invention do not terminate any of the signal lines on the Intel Slot 2 bus 210. Instead, the plurality of bridge terminators 220 are connected to a first end of the Intel Slot 2 bus 210 connected to the bridge 200 and the plurality of bus end terminators 230 are connected to a second end of the Intel Slot 2 bus connector 140 farthest from the bridge 200. The plurality of bridge terminators 220 replace the Intel specified terminations with the terminations listed in FIG. 3. Therefore, each one hundred fifty ohm pull-up resistor required by Intel is replaced with an eighty two ohm resistor.

Figure 4:
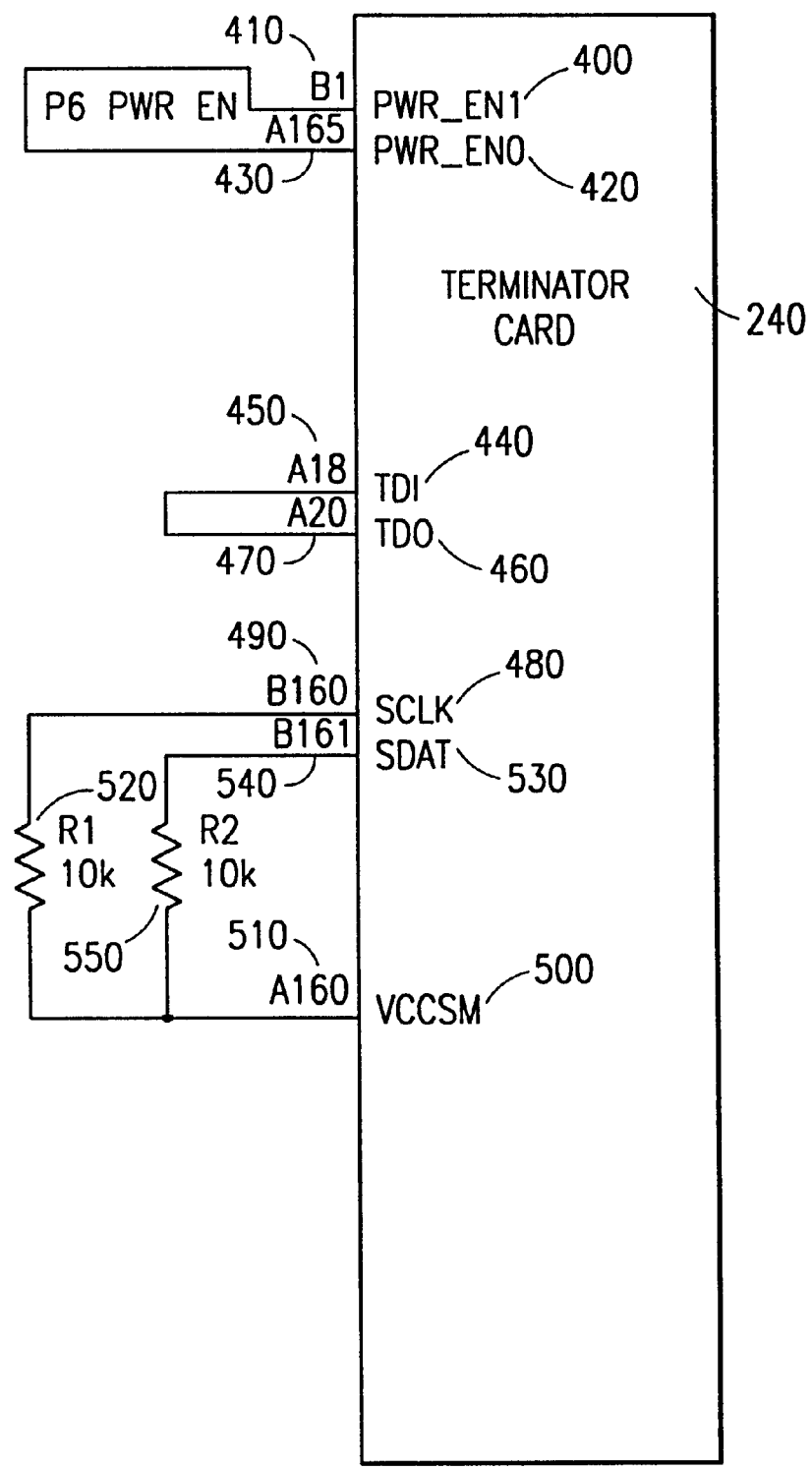
FIG. 4 is a wiring diagram for a terminator card comprising the present invention.

Referring additionally now to FIG. 4, there is illustrated a wiring diagram for a terminator card comprising the present invention. In the present invention, Power Enable1 (PWR_EN1) 400 on Intel Slot 2 bus connector 140 pin B1 410 is connected to Power Enable2 (PWR_EN2) 420 on Intel Slot 2 bus connector 140 pin A165 430, JTAG signal TDI 440 on Intel Slot 2 bus connector 140 pin A18 450 is connected to JTAG signal TDO 460 on Intel Slot 2 bus connector 140 pin A20 470, serial communication line SCLK 480 on Intel Slot 2 bus connector 140 pin B160 490 is connected to power signal VCCSM 500 on Intel Slot 2 bus connector pin A160 510 through a first ten thousand kilo-ohm resistor 520, and serial communication line SDAT 530 on Intel bus connector 140 pin B161 540 is connected to power signal VCCSM 500 on Intel Slot 2 bus connector pin A160 510 through a second ten thousand kilo-ohm resistor 550. All remaining terminations required by Intel on Intel Slot 2 bus termination cards 130 are eliminated.

Based on the foregoing, it should now be understood and appreciated that the system and method of the present invention provides numerous advantages, including compactness, ease of layout, ease of signal routing, reduced number of components and cost savings. Furthermore, although the preferred embodiment of the apparatus of the present invention have been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. A computer system comprising:
   a computer bus configured in an in-line bus topology;
   a plurality of Intel Slot 2 bus type connectors connected to the computer system bus;
   a first plurality of bus terminators electrically connected to a first end of the in-line computer system bus;
   a second plurality of bus terminators electrically connected to a second end of the in-line computer system bus; and
   a terminator card inserted into each unpopulated Intel Slot 2 bus type connector, wherein the first plurality of bus terminators comprise terminations which are in accordance with Intel Slot 2 termination cards as specified by Intel wherein, pull-up termination resistors having a resistance of eighty two ohms are substituted for pull-up termination resistors specified by Intel to have a resistance of one hundred and fifty ohms.

2. The terminator card, as recited in claim 1, wherein terminator card components and electrical traces consist of:
- a short circuit connection between a power_enable1 signal and a power_enable2 signal;
- a short circuit connection between a JTAG TDI signal and a JTAG TDO signal;
- a first resistor having a resistance value of ten kilohms connected between a serial communication bus line SCLK and a supply power voltage VCCSM; and
- a second resistor having a resistance value often kilohms connected between a serial communication bus line SDAT and the supply power voltage VCCSM.

3. The computer system, as recited in claim 2, further comprising:
- a secondary bus for communication with at least one auxiliary device; and
- a bridge connected to the first end of the in-line computer system bus and to the secondary bus, the bridge for interfacing between the computer system bus and the secondary bus.

4. The computer system, as recited in claim 3, wherein the auxiliary device is located off a motherboard supporting the computer system bus.

5. A computer system comprising:
- an Intel Slot 2 bus configured in an in-line bus topology;
- a plurality of Intel Slot 2 bus connectors connected to the Intel Slot 2 bus;
- a first plurality of bus terminators electrically connected to a first end of the in-line Intel Slot 2 bus;
- a second plurality of bus terminators electrically connected to a second end of the in-line Intel Slot 2 bus; and
- a terminator card inserted into each unpopulated Intel Slot 2bus type connector, wherein the first plurality of bus terminators comprise terminations which are in accordance with Intel Slot 2 termination cards as specified by Intel wherein, pull-up termination resistors having a resistance of eighty two ohms are substituted for pull-up termination resistors specified by Intel to have a resistance of one hundred and fifty ohms.

6. The terminator card, as recited in claim 5, wherein terminator card components and electrical traces consist of:
- a short circuit connection between a power_enable1 signal and a power_enable2 signal;
- a short circuit connection between a JTAG TDI signal and a JTAG TDO signal;
- a first resistor having a resistance value of ten kilohms connected between a serial communication bus line SCLK and a supply power voltage VCCSM; and
- a second resistor having a resistance value of ten kilohms connected between a serial communication bus line SDAT and the supply power voltage VCCSM.

7. The computer system, as recited in claim 6, further comprising:
- a secondary bus for communication with at least one auxiliary device; and
- a bridge connected to the first end of the in-line Intel Slot 2 bus and to the secondary bus, the bridge for interfacing between the Intel Slot 2 bus and the secondary bus.

8. The computer system, as recited in claim 7, wherein the auxiliary device is located off a motherboard supporting the Intel Slot 2 bus.

9. A computer system bus configuration and associated termination for an Intel Slot 2 bus supporting communication for at least one Intel Pentium II Xeon processor comprising:
- a plurality of Intel Slot 2 bus connectors connected to the Intel Slot 2 bus;
- a first plurality of bus terminators electrically connected to a first end of the in-line Intel Slot 2 bus;
- a second plurality of bus terminators electrically connected to a second end of the in-line Intel Slot 2 bus;
- a secondary bus for communication with at least one auxiliary device;
- a bridge connected to the first end of the in-line Intel Slot 2 bus and to the secondary bus, the bridge for interfacing between the Intel Slot 2 bus and the secondary bus; and
- a terminator card inserted into each unpopulated Intel Slot 2 bus connector.

10. The computer system, as recited in claim 9, wherein the first plurality of bus terminators comprise terminations which are in accordance with Intel Slot 2 termination cards as specified by Intel wherein, pull-up termination resistors having a resistance of eighty two ohms are substituted for pull-up termination resistors specified by Intel to have a resistance of one hundred and fifty ohms, and further wherein, the terminator card components and electrical traces consist of:
- short circuit connection between a power_enable1 signal and a power_enable2 signal;
- a short circuit connection between a JTAG TDI signal and a JTAG TDO signal;
- a first resistor having a resistance value of ten kilohms connected between a serial communication bus line SCLK and a supply power voltage VCCSM; and
- a second resistor having a resistance value often kilohms connected between a serial communication bus line SDAT and the supply power voltage VCCSM.

* * * * *